US011641147B2

(12) United States Patent
Ota

(10) Patent No.: US 11,641,147 B2
(45) Date of Patent: May 2, 2023

(54) MOTOR HAVING A CHOKE COIL

(71) Applicant: MINEBEA MITSUMI Inc., Nagano (JP)

(72) Inventor: Masami Ota, Nagano (JP)

(73) Assignee: MINEBEA MITSUMI Inc., Nagano (JP)

(*) Notice: Subject to any disclaimer, the term of this patent is extended or adjusted under 35 U.S.C. 154(b) by 129 days.

(21) Appl. No.: 16/934,326

(22) Filed: Jul. 21, 2020

(65) Prior Publication Data

US 2021/0028669 A1    Jan. 28, 2021

(30) Foreign Application Priority Data

Jul. 23, 2019 (JP) .............................. JP2019-135076

(51) Int. Cl.
*H02K 5/22* (2006.01)
*H02K 11/02* (2016.01)
*H02K 11/026* (2016.01)

(52) U.S. Cl.
CPC ............. *H02K 11/02* (2013.01); *H02K 5/225* (2013.01); *H02K 11/026* (2013.01)

(58) Field of Classification Search
CPC ........ H02K 5/143; H02K 5/145; H02K 5/146; H02K 5/148; H02K 5/22; H02K 5/225; H02K 11/02; H02K 11/026
See application file for complete search history.

(56) References Cited

U.S. PATENT DOCUMENTS 4,748,356 A * 5/1988 Okashiro ............... H02K 5/225
                                                              310/43
2010/0320854 A1   12/2010 Yamazaki et al.

FOREIGN PATENT DOCUMENTS

| CN | 113746276 A | * | 12/2021 |
|---|---|---|---|
| JP | S62-124292 U | | 8/1987 |
| JP | 2002-335654 A | | 11/2002 |
| JP | 2008-061428 A | | 3/2008 |
| JP | 2010154659 A | * | 7/2010 |
| JP | 2011-004569 A | | 1/2011 |
| JP | 2011-035976 A | | 2/2011 |
| JP | 2018-074725 A | | 5/2018 |

OTHER PUBLICATIONS

Notice of Reasons for Refusal dated Feb. 28, 2023 in the corresponding Japanese Application No. 2019-135076 and English translation.

* cited by examiner

*Primary Examiner* — Eric Johnson
(74) *Attorney, Agent, or Firm* — Pearne & Gordon LLP

(57) ABSTRACT

The present disclosure is related to providing a motor capable of removing electric noise sufficiently. The present disclosure is also related to providing a motor capable of handling cases where no choke coil is disposed. A motor comprising a choke coil, a terminal electrically connected to a lead wire led out from the choke coil, and a bracket including a first wall part, a second wall part and an elastic part located between the first wall part and the second wall part in an axial direction of the choke coil, in which the choke coil is located between the elastic part and the second wall part in the axial direction, the terminal is sandwiched between the first wall part and the elastic part in the axial direction and the lead wire is led out from the elastic part side to the first wall part side.

7 Claims, 7 Drawing Sheets

MOTOR HAVING A CHOKE COIL

CROSS REFERENCE TO RELATED APPLICATIONS

This application claims the benefit of Japanese Patent Application No. 2019-135076, filed Jul. 23, 2019, which is hereby incorporated by reference in its entirety.

BACKGROUND

Technical Field

The present disclosure relates to a motor.

Background

Conventionally, motors including a terminal connected to an external terminal and a bracket accommodating the terminal, and driven when an external terminal is connected to the terminal are known.

A technology for providing such a motor provided with a choke coil to suppress malfunction or the like caused by electric noise generated when the motor is driven and propagating to other electric devices or electronic devices or the like is known (see Japanese Patent Laid-Open No. 2011-004569).

For example, in the case of the motor disclosed in Japanese Patent Laid-Open No. 2011-004569, depending on routing of a lead wire led out from a choke coil, electric noise intercepted by the choke coil may propagate to the lead wire, making it difficult to remove the electric noise sufficiently.

Moreover, a motor structure that can handle both cases where a choke coil is disposed and cases where no choke coil is disposed has been required.

The present disclosure is related to providing a motor capable of removing electric noise sufficiently. The present disclosure is also related to providing a motor capable of handling cases where no choke coil is disposed.

SUMMARY

In accordance with one aspect of the present disclosure, a motor of the present disclosure comprising a choke coil, a terminal electrically connected to a lead wire led out from the choke coil, and a bracket including a first wall part, a second wall part and an elastic part located between the first wall part and the second wall part in an axial direction of the choke coil, in which the choke coil is located between the elastic part and the second wall part in the axial direction of the choke coil, the terminal is sandwiched between the first wall part and the elastic part in the axial direction of the choke coil and the lead wire is led out from the elastic part side to the first wall part side.

In the motor of the present disclosure, the elastic part may bend from the first wall part side to the second wall part side.

The terminal and the lead wire may be sandwiched between the first wall part and the elastic part in the axial direction of the choke coil.

The lead wire may be engaged in a recessed part of the terminal.

In the motor of the present disclosure, the bracket may be provided with a third wall part and a fourth wall part opposing each other, and the choke coil may be interposed between the third wall part and the fourth wall part in a radial direction of the choke coil.

Furthermore, in the motor of the present disclosure, a recessed part may be formed at a bottom surface of the bracket and part of the choke coil may be fitted in the recessed part.

On the other hand, in accordance with another aspect of the present disclosure, a motor comprising a terminal member including a pair of terminals and a connection part connecting the pair of terminals and a bracket including a first wall part, a second wall part and an elastic part located between the first wall part and the second wall part, in which the terminal member includes a first marking formed between one terminal of the pair of terminals and the connection part and a second marking formed between another terminal and the connection part, and the connection part is separable from the pair of terminals.

At this time, a recessed part may be formed at a bottom surface of the bracket and the connection part may be disposed and opposed to the recessed part.

DETAILED DESCRIPTION

Hereinafter, a motor according to an embodiment of the present disclosure will be described with reference to the accompanying drawings.

Figure 1:
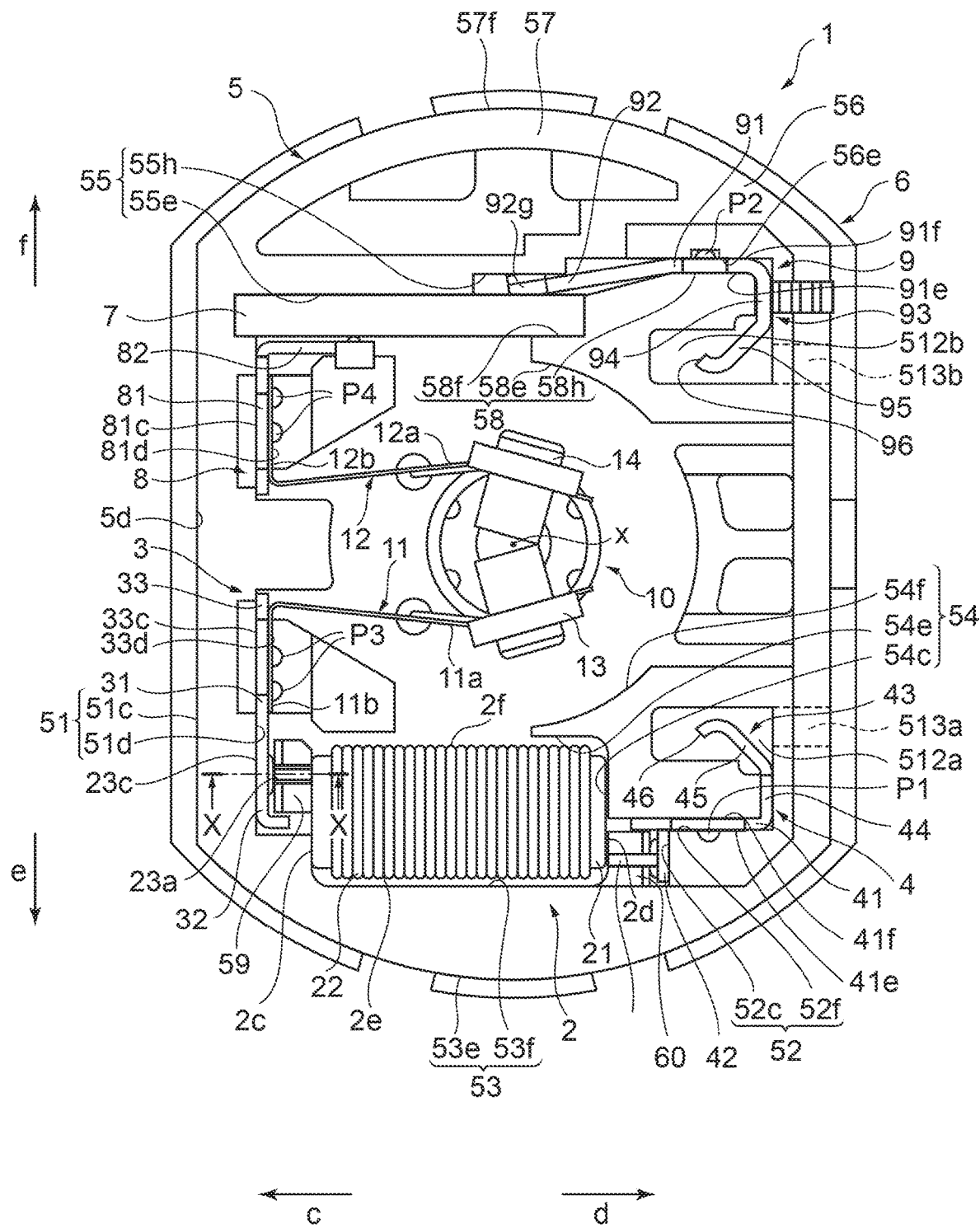
FIG. 1 is a front view schematically illustrating a motor according to an embodiment, which is an example of the present disclosure.
Figure 2:
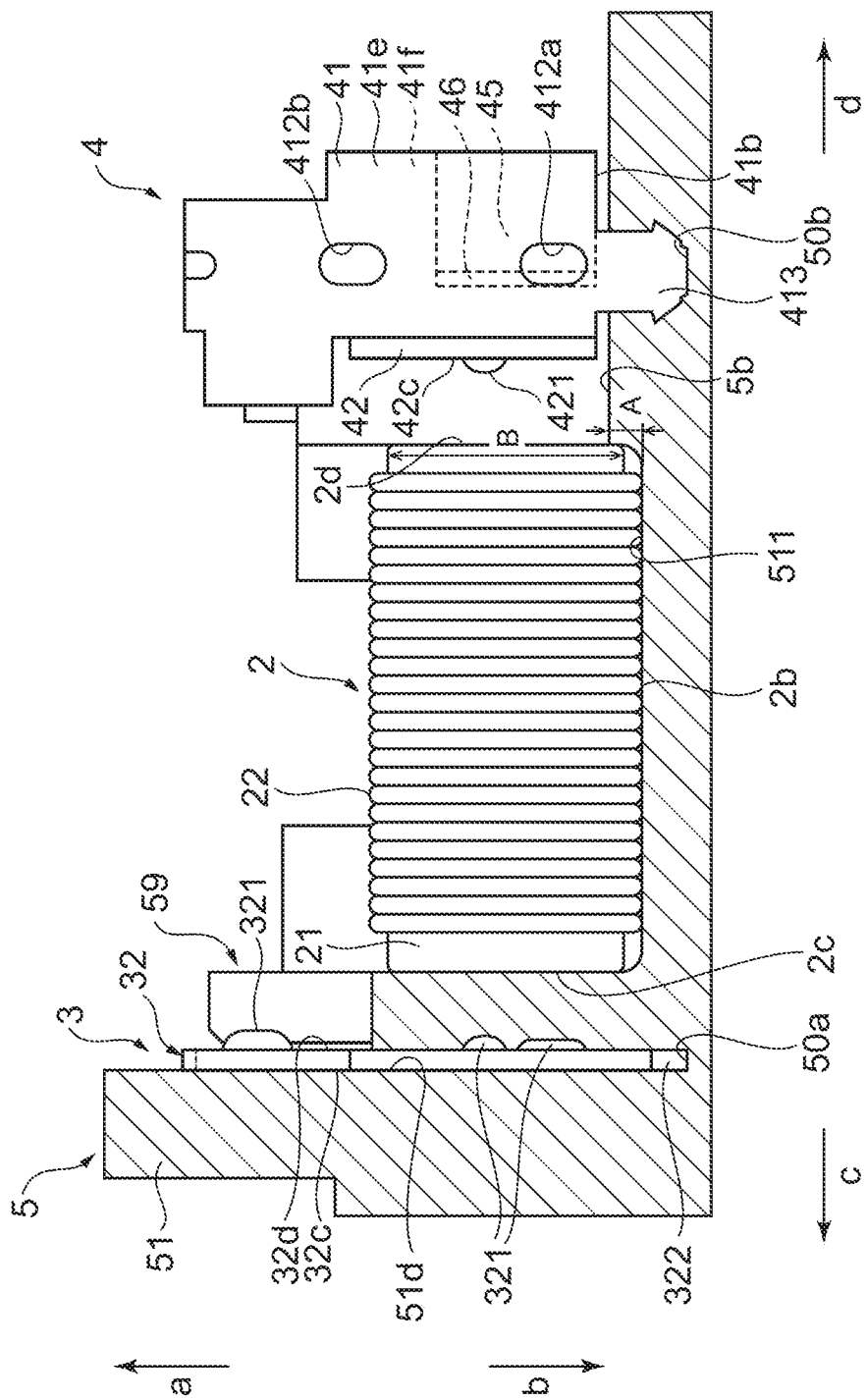
FIG. 2 is a side view schematically illustrating an area around a choke coil extracted from the motor according to an embodiment, which is an example of the present disclosure.
Figure 3:
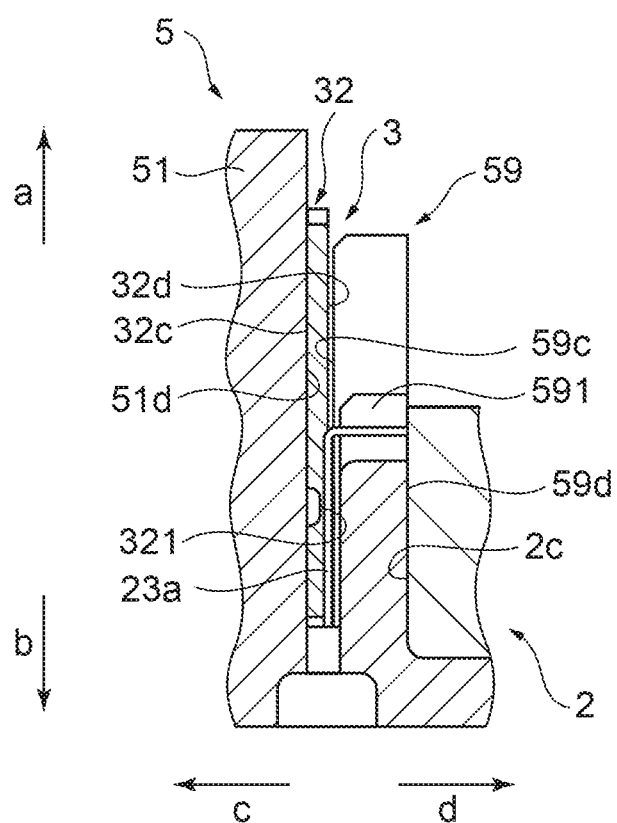
FIG. 3 is an enlarged cross-sectional view of an X-X cross section shown in FIG. 1.

FIG. 1 is a front view schematically illustrating a motor 1 according to an embodiment, which is an example of the present disclosure, FIG. 2 is a side view schematically illustrating an area around a choke coil 2 extracted from the motor 1 according to the embodiment, which is an example of the present disclosure. FIG. 3 is an enlarged cross-sectional view of an X-X cross section shown in FIG. 1.

As shown in FIG. 1 to FIG. 3, the motor 1 of the present embodiment is provided with a choke coil 2, terminals 3 and 4 connected to the choke coil 2 (hereinafter, the terminal 3 and the terminal 4 will be referred to as a "first terminal 3" and a "second terminal 4"), and a bracket 5 accommodating the choke coil 2, the first terminal 3 and the second terminal 4.

The motor 1 is provided with a case 6 accommodating the bracket 5, a PTC (positive temperature coefficient) thermistor 7 having a positive temperature coefficient, terminals 8 and 9 connected to the PTC thermistor 7 (hereinafter, the terminal 8 and the terminal 9 will be referred to as a "third terminal 8" and a "fourth terminal 9") and a commutator 10 electrically connected to the choke coil 2.

Note that in the description of the present embodiment, it is assumed that an arrow a direction in an axis x direction of the motor 1 is an upper side a and an arrow b direction is a lower side b. It is also assumed that of directions perpendicular to the axis x, an arrow c direction in a longitudinal direction of the choke coil 2 (arrow c direction and arrow d direction; hereinafter also referred to as a "longitudinal direction cd") is a side c in the longitudinal direction and an arrow d direction is another side d in the longitudinal direction. It is further assumed that of directions perpendicular to the axis x direction as well as the longitudinal direction cd (arrow e direction and arrow f direction; hereinafter also referred to as a "vertical direction ef"), an arrow e direction is a one side e in the vertical direction and an arrow f direction is another side f in the vertical direction. The longitudinal direction of the choke coil 2 is also an axial direction of the choke coil and the vertical direction of the choke coil 2 is also a radial direction of the choke coil 2.

In the motor 1 of the present embodiment, the first terminal 3 and the third terminal 8 provided on one side c in the longitudinal direction are connected to the commutator 10 and the second terminal 4 and the fourth terminal 9 provided on the other side d in the longitudinal direction are connected to an external terminal (not shown).

The choke coil 2 is provided on the arrow e side in the bracket 5 and includes an iron core 21 and a coil 22 wound around an outer circumferential surface of the iron core 21.

From the choke coil 2, a lead wire 23a led out from the coil 22 toward the one side c in the longitudinal direction and electrically connected to the commutator 10 (hereinafter, a lead wire to be connected to the commutator 10 will be referred to as a "commutator side lead wire") and a lead wire 23b led out from the coil 22 toward the other side d in the longitudinal direction and electrically connected to an external terminal (not shown) (hereinafter, a lead wire to be connected to the external terminal will be referred to as an "external terminal side lead wire") are led out.

The first terminal 3 is connected to the commutator side lead wire 23a led out from the choke coil 2. Furthermore, the second terminal 4 is connected to the external terminal side lead wire 23b led out from the choke coil 2.

The first terminal 3 includes a body part 31 extending in the vertical direction ef, an end portion 32 located on the choke coil 2 side and an end portion 33 located on the commutator 10 side.

In the end portion 32 of the first terminal 3, a side face part 32c on the one side c in the longitudinal direction rises toward the upper side a of the bracket 5, opposing a side 5d opposing the other side d in the longitudinal direction and a side face part 32d on the other side d in the longitudinal direction opposes a side face part 2c of the choke coil 2 (FIG. 3).

A distal end on the one side e of the end portion 32 in the vertical direction is bent at a substantially right angle toward the other side d in the longitudinal direction.

Protruding parts 321 protruding toward the other side d in the longitudinal direction are formed at the end portion 32. The end portion 32 also includes a fixing part 322 to be fixed to the bracket 5 at the lower side b (FIG. 2).

The fixing part 322 has a role of fixing the first terminal 3 to the bracket 5 by being fitted into an engagement hole 50a provided at a bottom surface portion 5b of the bracket 5.

In the end portion 33 of the first terminal 3, a side face part 33c on the one side c in the longitudinal direction rises toward the upper side a of the bracket 5 opposing the side 5d opposing the other side d in the longitudinal direction and a side face part 33d on the other side d in the longitudinal direction opposes the commutator 10.

The second terminal 4 includes a body part 41 including a side face part 41e facing the one side e in the vertical direction and a side face part 41f facing the other side f in the vertical direction, an end portion 42 bent at a substantially right angle from the one side c of the body part 41 in the longitudinal direction toward the one side e in the vertical direction and an end portion 43 bent at a substantially right angle from the other side d of the body part 41 in the longitudinal direction toward the other side f in the vertical direction.

The body part 41 of the second terminal 4 includes a fixing part 413 extending from a lower end portion 41b on the lower side b toward the lower side b and fixed to the bracket 5 (FIG. 2).

The fixing part 413 has a role of fixing the second terminal 4 to the bracket 5 by being fitted into an engagement hole 50b provided in the bottom surface portion 5b of the bracket 5.

Holes 412a and 412b are formed in the body part 41, pins P1 are inserted into the holes 412a and 412b to fix the second terminal 4 to the bracket 5.

In the end portion 42 of the second terminal 4, a side face part 42c facing the one side c in the longitudinal direction opposes the bracket 5. A protruding part 421 protruding toward the one side c in the longitudinal direction is formed at the end portion 42 (FIG. 2).

The end portion 43 of the second terminal 4 includes a bent portion 44 bent at a substantially right angle from the body part 41 toward the other side f in the vertical direction, a distal end portion 45 bent at an obtuse angle from the bent portion 44 toward the one side c in the longitudinal direction, and further, a most distal end portion 46, which constitutes a most distal end of the distal end portion 45. The most distal end portion 46 is further bent from the distal end portion 45 toward the one side e in the vertical direction.

The bracket 5 is formed of resin and includes a first wall part 51, a second wall part 52, a third wall part 53 and a fourth wall part 54 provided at the one side e in the vertical direction, a fifth wall part 55, a sixth wall part 56, a seventh wall part 57 and an eighth wall part 58 provided at the other side f in the vertical direction and elastic parts 59 and 60.

A recessed part 511 (hereinafter, the recessed part 511 of the bracket 5 will be referred to as a "bracket recessed part") is formed at the bottom surface portion 5b of the bracket 5 (FIG. 2).

The bracket 5 includes accommodating parts 512a and 512b provided on the other side d in the longitudinal direction and openings 513a and 513b that connect spaces of the accommodating parts 512a and 512b to space outside the bracket 5.

The first wall part 51 is provided on the one side c in the longitudinal direction. In the first wall part 51, an external wall surface part 51c opposing the one side c in the longitudinal direction is in contact with the case 6 and an inner wall surface portion 51d facing the other side d in the longitudinal direction opposes the first terminal 3.

The second wall part 52 is provided on the other side d in the longitudinal direction. In the second wall part 52, an inner wall surface portion 52c facing the one side c in the longitudinal direction opposes a side face part 2d of the choke coil 2 and the inner wall surface portion 52f facing the other side f in the vertical direction is in contact with a side face part 41e of the body part 41 of the second terminal 4.

In the longitudinal direction cd, the choke coil 2 is provided between the first wall part 51 and the second wall part 52.

The third wall part 53 is provided between the first wall part 51 and the second wall part 52 in the longitudinal direction cd. In the third wall part 53, an external wall surface part 53e facing the one side e in the vertical direction is in contact with the case 6 and the inner wall surface portion 53f facing the other side f in the vertical direction opposes a side face part 2e of the choke coil 2.

The fourth wall part 54 is provided on the other side d in the longitudinal direction. In the fourth wall part 54, an inner wall surface portion 54c facing the one side c in the longitudinal direction opposes the side face part 2d of the choke coil 2 and an inner wall surface portion 54e facing the one side e in the vertical direction opposes a side face part 2f of the choke coil 2.

In the fourth wall part 54, an inner wall surface portion 54f opposing the other side f in the vertical direction opposes the commutator 10. The inner wall surface portion 54f is curved so that the fourth wall part 54 on the other side f in the vertical direction is recess.

The third wall part 53 and the fourth wall part 54 face each other, and the choke coil 2 is located between the third wall part 53 and the fourth wall part 54 in the vertical direction ef. More specifically, a direction in which the inner wall surface portion 53f of the third wall part 53 extends and a direction in which the inner wall surface portion 54e of the fourth wall part 54 extends are parallel to the longitudinal direction cd of the choke coil 2.

The fifth wall part 55 is provided on the one side c in the longitudinal direction. In the fifth wall part 55, an inner wall surface portion 55e facing the one side e in the vertical direction is in contact with a PTC thermistor 7 and an inner wall surface portion 55h extending to the other side d in the longitudinal direction opposes the fourth terminal 9.

The sixth wall part 56 is provided on the other side d in the longitudinal direction. In the sixth wall part 56, an inner wall surface portion 56e facing the one side e in the vertical direction opposes the fourth terminal 9.

The seventh wall part 57 is provided between the fifth wall part 55 and the sixth wall part 56 in the longitudinal direction cd. In the seventh wall part 57, an external wall surface part 57f facing the other side f in the vertical direction is in contact with the case 6.

The eighth wall part 58 is provided on the other side d in the longitudinal direction. In the eighth wall part 58, an inner wall surface portion 58e facing the one side e in the vertical direction opposes the commutator 10. The inner wall surface portion 58e is curved so that the eighth wall part 58 on the one side e in the vertical direction is recess.

In the eighth wall part 58, an inner wall surface portion 58f facing the other side f in the vertical direction is in contact with the PTC thermistor 7 and an inner wall surface portion 58h extending to the other side d in the longitudinal direction opposes the fourth terminal 9.

The eighth wall part 58 and the fifth wall part 55 oppose each other and the PTC thermistor 7 is provided between the eighth wall part 58 and the fifth wall part 55 in the vertical direction ef. More specifically, the PTC thermistor 7 is sandwiched between the inner wall surface portion 58f of the eighth wall part 58 and the inner wall surface portion 55e of the fifth wall part 55.

The eighth wall part 58 and the sixth wall part 56 oppose each other and the fourth terminal 9 is provided between the eighth wall part 58 and the sixth wall part 56 in the vertical direction ef. More specifically, the fourth terminal 9 is sandwiched between the inner wall surface portion 58h of the eighth wall part 58 and the inner wall surface portion 56e of the sixth wall part 56.

The elastic parts 59 and 60 are formed of resin, have thin plate shapes and have elasticity. The elastic parts 59 and 60 are located between the first wall part 51 and the second wall part 52 in the longitudinal direction cd.

The elastic part 59 can bend from the first wall part 51 side to the second wall part 52 side. The elastic part 59 is provided between the first wall part 51 and the choke coil 2 in the longitudinal direction cd.

More specifically, in the elastic part 59, a side face part 59c facing the one side c in the longitudinal direction opposes the side face part 32d of the end portion 32 of the first terminal 3 and a side face part 59d facing the other side d in the longitudinal direction opposes the side face part 2c of the choke coil 2 (FIG. 3).

That is, the choke coil 2 is provided between the side face part 59d of the elastic part 59 and the inner wall surface portion 52c of the second wall part 52 in the longitudinal direction cd.

A hole 591 having a shape cut out in a vertically elongated U shape from the upper side a to the lower side b is formed in the elastic part 59. A commutator side lead wire 23a is inserted into the hole 591 from the upper side a and located at a base of the U shape. The commutator side lead wire 23a inserted into the hole 591 is led out from the elastic part 59 side to the first wall part 51 side (FIG. 3).

A width dimension (not shown) of the hole 591 in the vertical direction ef is formed to be larger than a diameter dimension, which is a dimension of the commutator side lead wire 23a in the vertical direction ef.

The elastic part 59 sandwiches the end portion 32 of the first terminal 3 with the inner wall surface portion 51d of the first wall part 51. That is, the end portion 32 and the commutator side lead wire 23a led out from the hole 591 are sandwiched and fixed between the inner wall surface portion 51d of the first wall part 51 and the side face part 59c of the elastic part 59 in the longitudinal direction cd. In this way, the commutator side lead wire 23a and the first terminal 3 are connected together (FIG. 3).

The elastic part 60 can bend from the second wall part 52 side to the first wall part 51 side.

Furthermore, the elastic part 60 is provided between the choke coil 2 and the second wall part 52 in the longitudinal direction cd.

More specifically, in the elastic part 60, a side face part (not shown) facing the other side d in the longitudinal direction opposes the side face part 42c of the end portion 42 of the second terminal 4 and a side face part (not shown) facing the one side c in the longitudinal direction opposes the side face part 2d of the choke coil 2.

A hole (not shown) having a shape cut out in a vertically elongated U shape from the upper side a to the lower side b is formed in the elastic part 60. The external terminal side lead wire 23b is inserted into this hole from the upper side a and located at the base of the U-shape. The external terminal side lead wire 23b inserted in the hole is led out from the elastic part 60 side to the second wall part 52 side.

A width dimension (not shown) of the hole in the vertical direction ef is formed to be larger than the diameter dimension, which is a dimension of the external terminal side lead wire 23b in the vertical direction ef.

The elastic part 60 sandwiches the end portion 42 of the second terminal 4 with the inner wall surface portion 52c of the second wall part 52. That is, the end portion 42 and the external terminal side lead wire 23b led out from the hole of the elastic part 60 are sandwiched and fixed between the inner wall surface portion 52c of the second wall part 52 and the elastic part 60 in the longitudinal direction cd. In this way, the external terminal side lead wire 23b and the second terminal 4 are connected together.

The bracket recessed part 511 has such a shape that the bottom surface portion 5b of the bracket 5 is recessed from the upper side a to the lower side b. A depth dimension A is a dimension of the bracket recessed part 511. The bracket recessed part 511 is recessed from the upper side a to the lower side b. The depth dimension A is smaller than a height dimension B. The height dimension B is a dimension of the choke coil 2 in the axis x direction (A<B). A part of the choke coil 2 is fitted in the bracket recessed part 511. More specifically, an undersurface portion 2b on the lower side b of the choke coil 2 is fitted in the bracket recessed part 511 (FIG. 2).

The accommodating part 512a accommodates the end portion 43 of the second terminal 4 and communicates with space outside the bracket 5 through the opening 513a.

The accommodating part 512b accommodates an end portion 93 of the fourth terminal 9 and communicates with space outside the bracket 5 through the opening 513b.

External terminals (not shown) are inserted in the openings 513a and 513b. The external terminals inserted from the opening 513a comes into contact with the end portion 43 of the second terminal 4 accommodated in the accommodating part 512a and thereby electrically connected to the choke coil 2.

The external terminal inserted from the opening 513b comes into contact with the end portion 93 of the fourth terminal 9 accommodated in the accommodating part 512b and thereby electrically connected to the PTC thermistor 7.

The PTC thermistor 7 is provided on the other side f in the vertical direction and connected to the fourth terminal 9 on the other side d in the longitudinal direction.

The third terminal 8 includes a body part 81 extending in the vertical direction of and an end portion 82 on the PTC thermistor 7 side.

In the body part 81, a side face part 81c facing the one side c in the longitudinal direction rises to the upper side a of the bracket 5 facing the side 5d facing the other side d in the longitudinal direction. A side face part 81d facing the other side d in the longitudinal direction opposes the commutator 10.

The end portion 82 is bent at a substantially right angle from the other side f of the body part 81 in the vertical direction toward the other side d in the longitudinal direction and contacting the PTC thermistor 7.

The fourth terminal 9 includes a body part 91 including a side face part 91e facing the one side e in the vertical direction and a side face part 91f facing the other side f in the vertical direction, an end portion 92 bent at an obtuse angle from the one side c of the body part 91 in the longitudinal direction to the one side e in the vertical direction, and an end portion 93 bent at a substantially right angle from the other side d of the body part 91 in the longitudinal direction to the one side e in the vertical direction.

The body part 91 of the fourth terminal 9 is fixed to the bracket 5 via a pin P2. A distal end portion 92g of the end portion 92 of the fourth terminal 9 is connected to the PTC thermistor 7.

The end portion 93 of the fourth terminal 9 includes a bent portion 94 bent at a substantially right angle from the body part 91 toward the one side e in the vertical direction, a distal end portion 95 bent at an obtuse angle from the bent portion 94 toward the one side c in the longitudinal direction, and a most distal end portion 96, which further becomes a most distal end of the distal end portion 95. The most distal end portion 96 is further bent from the distal end portion 95 toward the other side f in the vertical direction.

The fourth terminal 9 is sandwiched between the sixth wall part 56 and the eighth wall part 58. More specifically, the side face part 91e of the body part 91 is in contact with the inner wall surface portion 58h of the eighth wall part 58. The side face part 91f of the body part 91 is in contact with the inner wall surface portion 56e of the sixth wall part 56.

The commutator 10 includes a conductive body 11 provided on the one side e in the vertical direction, a conductive body 12 provided on the other side f in the vertical direction, a brush 13 fixed to the conductive body 11 and a brush 14 fixed to the conductive body 12.

One side 11a of the conductive body 11 is connected to the brush 13, and the other side 11b is connected to the first terminal 3. More specifically, the conductive body 11 is fixed to the side face part 33d of the end portion 33 of the first terminal 3 via a pin P3. In this way, the conductive body 11 is connected to the first terminal 3.

One side 12a of the conductive body 12 is connected to the brush 14 and the other side 12b is connected to the third terminal 8. More specifically, the conductive body 12 is fixed to the side face part 81d of the body part 81 of the third terminal 8 via pins P4. In this way, the conductive body 12 is connected to the third terminal 8.

In the motor 1 according to the present embodiment, the choke coil 2 is located between the elastic part 59 and the second wall part 52 in the longitudinal direction cd, the first terminal 3 is sandwiched between the first wall part 51 and the elastic part 59 in the longitudinal direction cd, and the commutator side lead wire 23a is led out from the elastic part 59 side toward the first wall part 51 side. The second terminal 4 is sandwiched between the second wall part 52 and the elastic part 60 in the longitudinal direction cd, and the external terminal side lead wire 23b is led out from the elastic part 60 side toward the second wall part 52 side. This prevents the choke coil 2 from coming closer to the commutator side lead wire 23a and the external terminal side lead wire 23b, prevents electric noise blocked in the choke coil 2 (e.g., a low-frequency current or high-frequency current) from propagating to the commutator side lead wire 23a and the external terminal side lead wire 23b and can thereby suppress deterioration of electric noise removing efficiency.

In the motor 1 according to the present embodiment, the elastic part 59 can bend from the first wall part 51 side to the second wall part 52 side. The elastic part 60 can bend from the second wall part 52 side to the first wall part 51 side. Therefore, the elastic part 59 bends to the choke coil 2 side, thereby presses the choke coil 2 against the second wall part 52 side, the elastic part 60 bends to the choke coil 2 side, thereby presses the choke coil 2 against the first wall part 51 side, and can thereby fix the choke coil 2 to the bracket 5.

Furthermore, in the motor 1 according to the present embodiment, the first terminal 3 and the commutator side lead wire 23a are sandwiched between the first wall part 51 and the elastic part 59 in the longitudinal direction cd. Therefore, it is possible to fix the commutator side lead wire 23a and the first terminal 3 while connecting the commutator side lead wire 23a and the first terminal 3.

Furthermore, in the motor 1 according to the present embodiment, the second terminal 4 and the external terminal side lead wire 23b are sandwiched between the second wall part 52 and the elastic part 60 in the longitudinal direction cd. Therefore, it is possible to fix the external terminal side lead wire 23*b* and the second terminal 4 while connecting the external terminal side lead wire 23*b* and the second terminal 4.

As described above, the motor 1 according to the present embodiment is possible to suppress deterioration of electric noise removing efficiency.

Thereafter, motors according to modifications of the present disclosure will be described.

In the present modifications, members or components having the same functions and structures as the functions and structures of the above embodiment are assigned the same reference numerals and detailed description of the functions and structures is omitted (however, this does not apply to a case where a special explanation is added).

Figure 4:
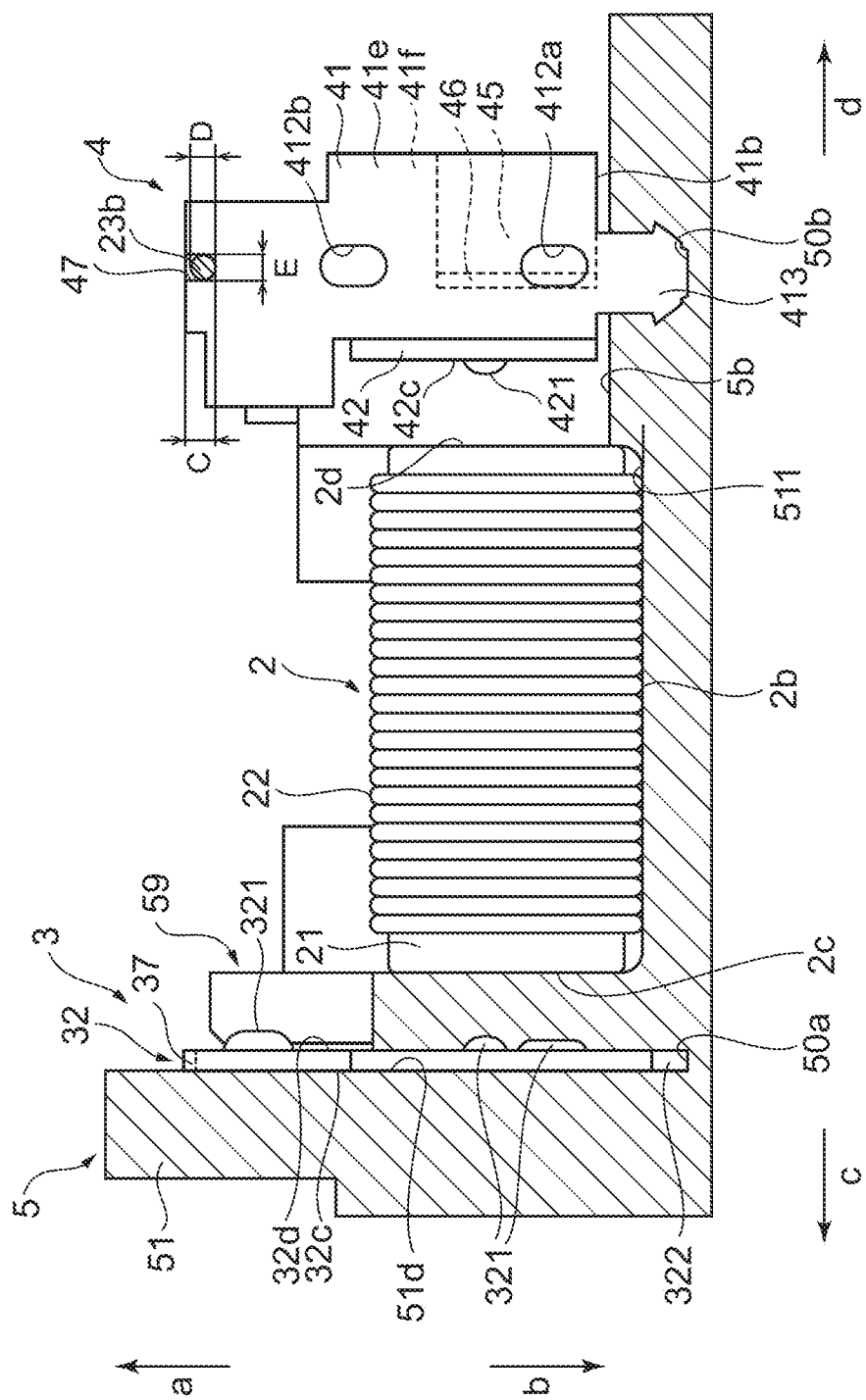
FIG. 4 is a side view schematically illustrating an area around a choke coil extracted from a motor according to a first modification, which is an example of the present disclosure.
Figure 5:
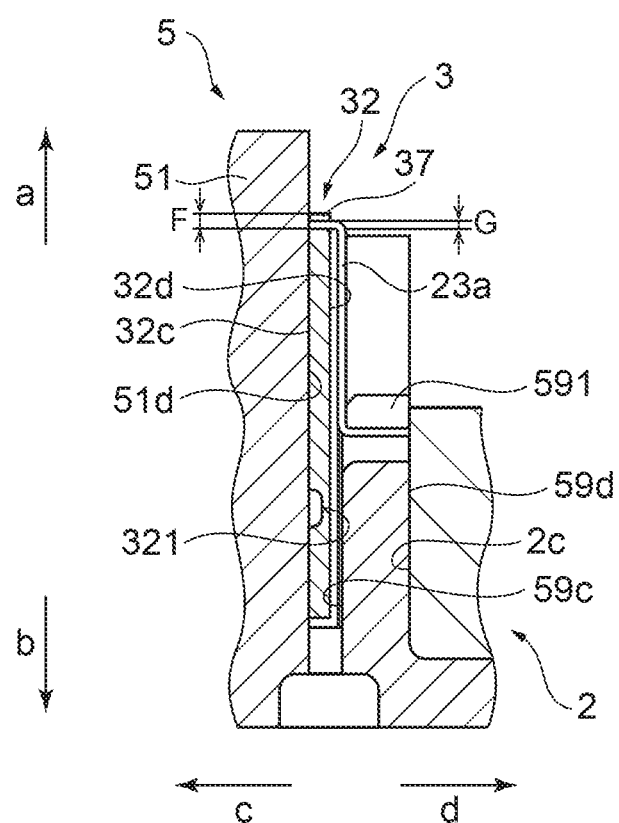
FIG. 5 is an enlarged cross-sectional view illustrating a terminal of the motor according to the first modification, which is an example of the present disclosure.

FIG. 4 is a side view schematically illustrating an area around the choke coil 2 extracted from the motor 1 according to a first modification of the present disclosure. FIG. 5 is an enlarged cross-sectional view illustrating a connection between the first terminal 3 and the commutator side lead wire 23*a* of the motor 1 according to the first modification of the present disclosure.

In the first modification, structures of the first terminal 3 and the second terminal 4 are the same as the structures in the above embodiment, whereas configurations of a connection between the first terminal 3 and the commutator side lead wire 23*a* and a connection between the second terminal 4 and the external terminal side lead wire 23*b* are different from the configurations in the above embodiment.

As shown in FIG. 4, a recessed part 47, which is recessed from the upper side a to the lower side b (hereinafter, the recessed part 47 of the second terminal 4 will be referred to as a "second terminal recessed part") is formed on the upper side a of the body part 41 of the second terminal 4. The external terminal side lead wire 23*b* is engaged in the second terminal recessed part 47.

More specifically, in the second terminal recessed part 47, a depth dimension C, which is a dimension of the part, is recessed from the upper side a to the lower side b. In the second terminal recessed part 47, a depth dimension C is larger than a diameter dimension D, to increase an area of contact between the second terminal 4 and the external terminal side lead wire 23*b* (C>D). The diameter dimension D is a dimension of the external terminal side lead wire 23*b* in the vertical direction. Note that the depth dimension C may also be equal to the diameter dimension D (C=D).

A width dimension E, which is a dimension of the second terminal recessed part 47 in an arrow cd direction is equal to the diameter dimension D of the external terminal side lead wire 23*b* (D=E) or the width dimension E is smaller (D>E) to increase an area of contact between the second terminal 4 and the external terminal side lead wire 23*b*.

The second terminal recessed part 47 is in contact with an outer circumference of the external terminal side lead wire 23*b* and is thereby connected to the external terminal side lead wire 23*b*. When the width dimension E is smaller (D>E), the external terminal side lead wire 23*b* is press-fitted and fixed to the second terminal recessed part 47.

A recessed part 37, which is recessed from the upper side a to the lower side b (hereinafter, the recessed part 37 of the first terminal 3 will be referred to as a "first terminal recessed part") is formed on the upper side a of the end portion 32 of the first terminal 3 as shown in FIG. 5. The commutator side lead wire 23*a* is engaged in the first terminal recessed part 37.

More specifically, in the first terminal recessed part 37, a depth dimension F, which is a dimension of the part, is recessed from the upper side a to the lower side b. In the first terminal recessed part 37, a depth dimension F is larger than (F>G) to increase an area of contact between the first terminal 3 and the commutator side lead wire 23*a*. The diameter dimension G is a dimension of the commutator side lead wire 23*a* in the vertical direction. Note that the depth dimension F may also be equal to the diameter dimension F (F=G).

A width dimension (not shown), which is a dimension of the first terminal recessed part 37 in the arrow of direction is equal to the diameter dimension C of the commutator side lead wire 23*a* or the width dimension is smaller than the diameter dimension C to increase an area of contact between the first terminal 3 and the commutator side lead wire 23*a*.

The first terminal recessed part 37 is in contact with an outer circumference of the commutator side lead wire 23*a* and is thereby connected to the commutator side lead wire 23*a*. When the width dimension is smaller than the diameter dimension C of the commutator side lead wire 23*a*, the commutator side lead wire 23*a* is press-fitted and fixed to the first terminal recessed part 37.

In the motor 1 according to the first modification, the commutator side lead wire 23*a* is engaged in the first terminal recessed part 37 formed in the first terminal 3. For this reason, even when the diameter dimension D of the commutator side lead wire 23*a* is large and it is difficult to sandwich the commutator side lead wire 23*a* between the first wall part 51 and the elastic part 59 as in the case of the above embodiment, it is possible to connect the commutator side lead wire 23*a* and the first terminal 3.

Furthermore, the external terminal side lead wire 23*b* is engaged in the second terminal recessed part 47 formed in the second terminal 4. For this reason, even when the diameter dimension F of the external terminal side lead wire 23*b* is large and it is difficult to sandwich the external terminal side lead wire 23*b* between the second wall part 52 and the elastic part 60 as in the case of the above embodiment, it is possible to connect the external terminal side lead wire 23*b* and the second terminal 4.

Figure 6:
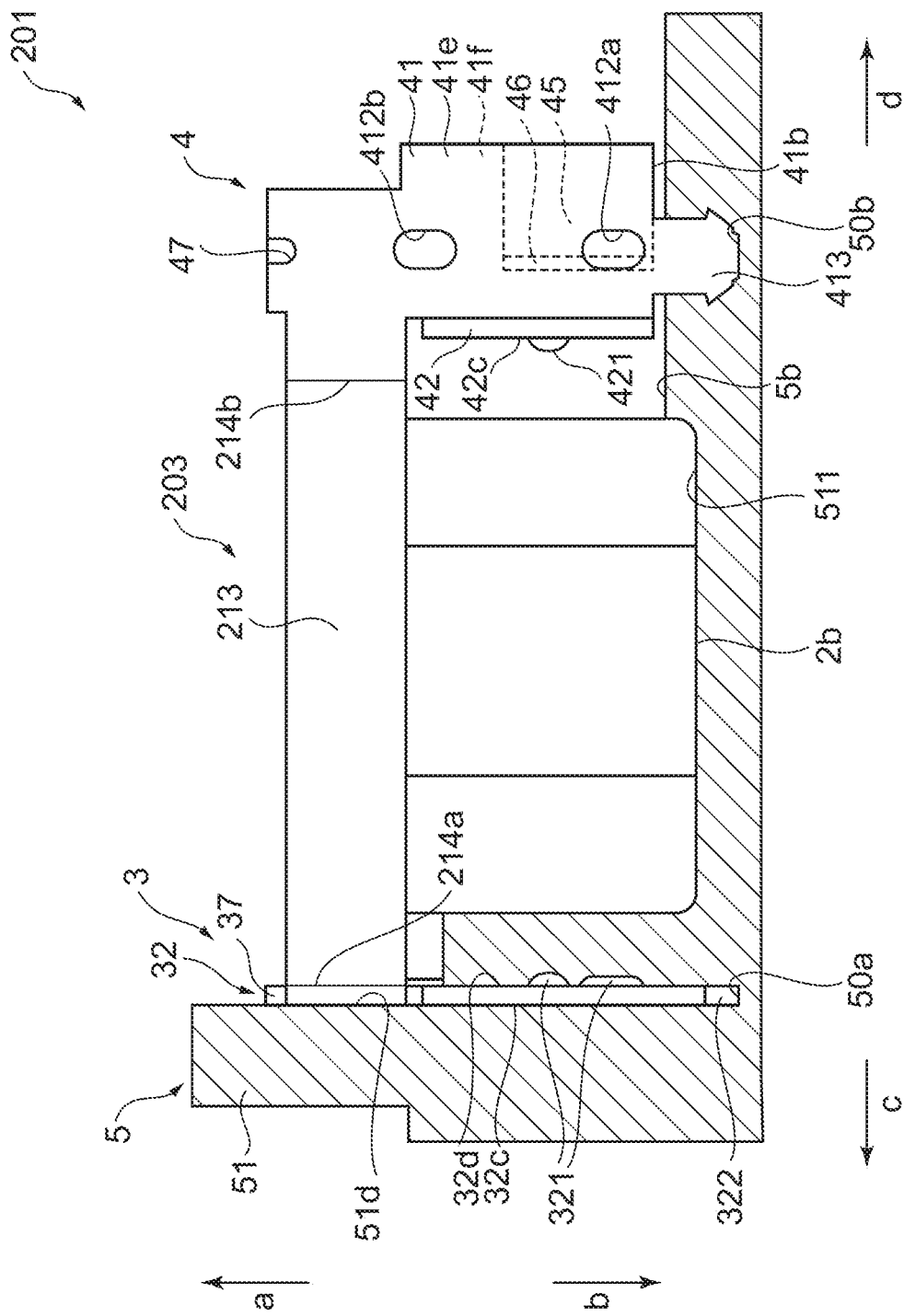
FIG. 6 is a side view schematically illustrating an area around a terminal member extracted from a motor according to a second modification, which is an example of the present disclosure.
Figure 7:
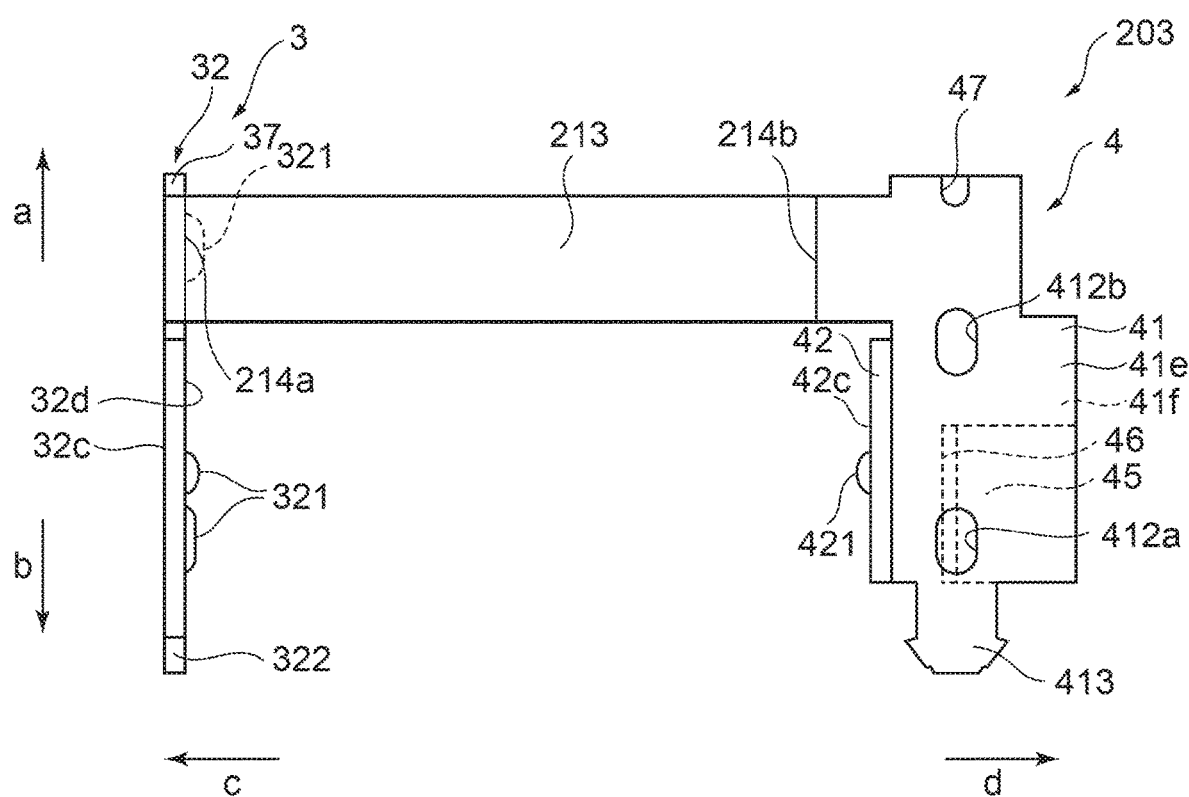
FIG. 7 is a side view illustrating a terminal member of the motor according to the second modification, which is an example of the present disclosure.

FIG. 6 is a side view schematically illustrating an area around a terminal member 203 extracted from a motor 201 according to a second modification and FIG. 7 is a side view illustrating the terminal member 203 of the motor 201 according to the second modification.

In the second modification, the configuration of the motor 201 is different from the configuration of the motor 1 in the above embodiment in that the motor 201 does not include the choke coil 2 but does include the terminal member 203.

As shown in FIG. 6 and FIG. 7, the terminal member 203 of the motor 201 according to the second modification includes a connection part 213 connecting the first terminal 3 and the second terminal 4 (a pair of terminals).

The terminal member 203 includes a first marking by a mark 214*a* formed between the first terminal 3 and the connection part 213 and a second marking by a mark 214*b* formed between the second terminal 4 and the connection part 213.

The connection part 213 is disposed opposed to the bracket recessed part 511 of the bracket 5. That is, the connection part 213 connects the upper side a of the first terminal 3 and the upper side a of the second terminal 4, and is disposed at the upper side a of the bracket recessed part 511 when the first terminal 3 and the second terminal 4 are fixed to the bracket 5.

The mark 214a is an indicator serving as an index when separating the first terminal 3 from the connection part 213. And the mark 214b is an indicator serving as an index when separating the second terminal 4 from the connection part 213.

The marks 214a and 214b in the present modification are thin parts and linearly thin. And by cutting the terminal member 203 at the marks 214a and 214b, it is possible to separate the connection part 213 from the first terminal 3 and the second terminal 4. Note that the marks 214a and 214b may be simple marks drawn using, for example, a pen. In this case, the regions of the marks 214a and 214b may be separately cut using a tool. The marks 214a and 214b may be, for example, notches or perforations formed in the terminal member 203.

In the motor 201 according to the second modification, the connection part 213 connecting the first terminal 3 and the second terminal 4 is marked with the marks 214a and 214b. For this reason, when the choke coil is disposed in the motor 201, by separating the first terminal 3 from the connection part 213 and separating the second terminal 4 from the connection part 213 along the marks 214a and 214b respectively, it is possible to dispose the choke coil in the bracket recessed part 511. That is, it is possible to provide the motor 201 capable of handling both cases where no choke coil is disposed and cases where the choke coil is disposed.

Note that the terminal member 203 according to the second modification can be used for the above embodiment or the above first modification. That is, the first terminal 3 and the second terminal 4 in the terminal member 203 are the same members as the first terminal 3 and the second terminal 4 in the above embodiment or the above first modification, and by separating the first terminal 3 and the second terminal 4 from the connection part 213, the first terminal 3 and the second terminal 4 can be independent terminals. For this reason, the terminal member 203 can handle all of the above embodiment, the above first modification and the present second modification.

Note that although the first terminal recessed part (reference numeral 37 in FIG. 6) is also formed in the first terminal 3 according to the above embodiment and the second terminal recessed part (reference numeral 47 in FIG. 6) is also formed in the second terminal 4, explanations are omitted in the description of the embodiment. That is, the first terminal 3 and the second terminal 4 in the above embodiment, the above first modification and the present second modification are the same members, and depending on the usage mode, the terminal member 203 may be used as is or may be used with the connection part 213 separated.

The motor of the present disclosure has been described so far by taking preferred embodiments as examples, but the motor of the present disclosure is not limited to the configurations of the above embodiment and modifications. For example, although a case has been described where the commutator side lead wire 23a in the motor 1 in the above embodiment is sandwiched between the first wall part 51 and the elastic part 59, and the external terminal side lead wire 23b is sandwiched between the second wall part 52 and the elastic part 60, only one of the commutator side lead wire 23a and the external terminal side lead wire 23b may be engaged in the first terminal recessed part 37 as in the case of the above first modification. That is, the commutator side lead wire 23a may be sandwiched between the first wall part 51 and the elastic part 59 and the external terminal side lead wire 23b may be engaged in the second terminal recessed part 47. Furthermore, the commutator side lead wire 23a may be engaged in the first terminal recessed part 37 and the external terminal side lead wire 23b may be sandwiched between the second wall part 52 and the elastic part 60.

In addition, those skilled in the art may modify the motor of the present disclosure as appropriate according to conventionally known knowledge. It goes without saying that such modifications are included in the category of the present disclosure as long as such modifications are provided with the configuration of the present disclosure.

What is claimed is:

1. A motor comprising:
   a commutator;
   a choke coil;
   a terminal electrically connected to a lead wire led out from the choke coil; and
   a bracket comprising a first wall part, a second wall part, an elastic part located between the first wall part and the second wall part in an axial direction of the choke coil, a bottom surface portion, and three external wall surfaces,
   a case accommodating the bracket, wherein
   the three external wall surfaces of the bracket are in contact with the case,
   the commutator is arranged between two of the three external wall surfaces,
   the choke coil is fixed to the bottom surface of the bracket and is located between the elastic part and the second wall part in the axial direction of the choke coil,
   the terminal is sandwiched between the first wall part and the elastic part in the axial direction of the choke coil, and
   the lead wire is led out from the elastic part side to the first wall part side.

2. The motor according to claim 1, wherein the elastic part can bend from the first wall part side to the second wall part side.

3. The motor according to claim 1, wherein the terminal and the lead wire are sandwiched between the first wall part and the elastic part in the axial direction of the choke coil.

4. The motor according to claim 1, wherein the lead wire is engaged in a recessed part of the terminal.

5. The motor according to claim 1, wherein
   the bracket comprises a third wall part and a fourth wall part opposing each other, and
   the choke coil is located between the third wall part and the fourth wall part in a radial direction of the choke coil.

6. The motor according to claim 1, wherein
   a recessed part is formed at a bottom surface of the bracket, and
   part of the choke coil is fitted in the recessed part.

7. The motor according to claim 1, wherein
   the bracket includes an accommodating part accommodating the terminal and an opening connecting a space of the accommodating part to a space outside of the bracket, the terminal being in contact with an external terminal inserted in the opening.

* * * * *